US005874018A

United States Patent [19]

[11] Patent Number: 5,874,018

[45] Date of Patent: Feb. 23, 1999

Ferrar et al.

[54] OVERCOATED CHARGE TRANSPORTING ELEMENTS AND GLASSY SOLID ELECTROLYTES

[75] Inventors: Wayne Thomas Ferrar, Fairport; Jane Robin Cowdery-Corvan, Webster; Edward T. Miskinis, Rochester; Catherine Newell, Rochester; Donald S. Rimai, Webster; Louis Joseph Sorriero, Rochester; John Anthony Sinicropi, Rochester; David Steven Weiss, Rochester; Nicholas Zumbulyadis, Rochester, all of N.Y.

[73] Assignee: Eastman Kodak Company, Rochester, N.Y.

[21] Appl. No.: 882,671

[22] Filed: Jun. 25, 1997

Related U.S. Application Data

[62] Division of Ser. No. 667,270, Jun. 20, 1996, Pat. No. 5,731,117.

[51] Int. Cl.[6] .............. H01G 9/15

[52] U.S. Cl. .............. 252/62.2; 429/192; 528/10

[58] Field of Search .............. 252/62.2; 429/192; 528/10

[56] References Cited

U.S. PATENT DOCUMENTS

| | | | |
|---|---|---|---|
| 4,027,073 | 5/1977 | Clark | 428/414 |
| 4,277,287 | 7/1981 | Frye | 106/287.12 |
| 4,439,509 | 3/1984 | Schank | 430/132 |
| 4,595,602 | 6/1986 | Schank | 427/76 |
| 4,923,775 | 5/1990 | Schank | 430/59 |
| 5,194,341 | 3/1993 | Bagley et al. | 429/189 |
| 5,204,201 | 4/1993 | Schank et al. | 430/66 |
| 5,215,820 | 6/1993 | Hosokawa et al. | 428/403 |
| 5,693,442 | 12/1997 | Weiss et al. | 430/66 |
| 5,731,117 | 3/1998 | Ferrar et al. | 430/66 |

OTHER PUBLICATIONS

"Electrolytes Dissolved in Polymers", J.M.G.Cowie and S.H.Cree, *Annu. Rev. Phys. Chem.* 1989, vol.40, 1989, pp.85–113.

"Solid Ionic Conductors", D.F.Schriver & G.C.Farrington, *Chemical and Engineering News*, vol. 63, No. 20, 1985, 42–57.

Polymer Electrolytes, J.S.Tonge & D.F.Shriver, *Polymers for Electronic Applications*, ed. J.H.Lai, CRC Press, Boca Raton, Florida, 1989, pp.157–210.

"Fast ion Conduction in Comb Shaped Polymers", J.M.G-.Cowie, *Integration of Fundamental Polymer Science and Technology*, vol. 2, Elsevior Publ., New York, 1988, pp.54–62.

*Primary Examiner*—Margaret W. Glass
*Attorney, Agent, or Firm*—John R. Everett

[57] ABSTRACT

Glassy solid electrolytes and charge transporting elements including antistatic elements and charge generating elements. The charge generating element has an electrically conductive layer, a charge generating layer overlying the electrically conductive layer, and a layer of glassy solid electrolyte overlying the electrically conductive layer. The glassy solid electrolyte includes a complex of silsesquioxane and a charge carrier. The complex has a surface resistivity from about $1\times10^{10}$ to about $1\times10^{17}$ ohms/sq. The complex has a $T^2$-silicon:$T^3$-silicon ratio of less than 1 to 1. The complex has a ratio of carbon atoms to silicon atoms of greater than about 1.2 to 1.

15 Claims, No Drawings

OVERCOATED CHARGE TRANSPORTING ELEMENTS AND GLASSY SOLID ELECTROLYTES

This is a divisional of application Ser. No. 08/667,270, filed 20 Jun. 1996, now U.S. Pat. No. 5,731,117.

FIELD OF THE INVENTION

The invention relates to charge transporting elements and solid electrolytes, and more particularly relates to overcoated electrophotographic charge generating elements and glassy solid electrolytes.

BACKGROUND OF THE INVENTION

Charge transporting elements have a support and a charge transport layer that charge moves across. Charge transporting elements include antistatic elements and charge generating elements. Antistatic elements have an antistatic layer which transports charge to prevent charge build up on the surface of the element.

In charge generating elements, incident light induces a charge separation across various layers of a multiple layer device. In an electrophotographic charge generating element, also referred to herein as an electrophotographic element, an electron-hole pair produced within a charge generating layer separate and move in opposite directions to develop a charge between an electrically conductive layer and an opposite surface of the element. The charge forms a pattern of electrostatic potential (also referred to as an electrostatic latent image). The electrostatic latent image can be formed by a variety of means, for example, by imagewise radiation-induced discharge of a uniform potential previously formed on the surface. Typically, the electrostatic latent image is then developed into a toner image by contacting the latent image with an electrographic developer and the toner image is then fused to a receiver. If desired, the latent image can be transferred to another surface before development or the toner image can be transferred before fusing.

The requirements of the process of generating and separating charge place severe limitations on the characteristics of the layers in which charge is generated and holes and/or electrons are transported. For example, many such layers are very soft and subject to abrasion. This places severe constraints upon the design of charge generating elements. Some configurations cannot provide a reasonable length of service unless an abrasion resistant overcoat layer is provided over the other layers of the element. This presents its own problems, since charge must be able to pass through the overcoat.

The resistivity of an overcoat has major consequences in an electrophotographic system. If the overcoat has high resistivity, the time constant for voltage decay will be excessively long relative to the processing time for the electrophotographic element and the overcoat will retain a residual potential after photodischarge of the underlying photoreceptor. The magnitude of the residual potential depends upon the initial potential, the dielectric constants of the various layers, and the thicknesses of each layer. A solution has been to reduce the thickness of the overcoat layer. Another solution is to provide an overcoat that is conductive. The overcoat must, however, not be too conductive. The electrophotographic element must be sufficiently electrically insulating in the dark that the element neither discharges excessively nor allows an excessive migration of charge along the surface of the element. An excessive discharge ("dark decay") would prevent the formation and development of the electrostatic latent image. Excessive migration causes a loss of resolution of the electrostatic image and the subsequent developed image. This loss of resolution is referred to as "lateral image spread". The extent of image degradation will depend upon processing time for the electrophotographic element and the thicknesses and dielectric constants of the layers. It is thus desirable to provide an overcoat that is neither too insulating nor too conductive.

The triboelectric properties of the overcoat must be matched to the triboelectric properties of the electrophotographic toner used to develop the electrostatic latent image. If the triboelectric properties are not matched, the electrophotographic element will triboelectrically charge against the electrophotographic toner. This causes disruption of the charge pattern of the electrostatic latent image and results in background in the resulting toner image. For example, an overcoat can triboelectrically match a particular negatively charging toner, but not triboelectrically match another toner that charges positively.

Silsesquioxanes are siloxane polymers, sometimes represented by the formula $(RSiO_{1.5})_x$, that are commonly prepared by the hydrolysis and condensation of trialkoxysilanes. U.S. Pat. No. 4,027,073 to Clark teaches the use of silsesquioxanes as abrasion resistant coatings on organic polymers. Typical applications include scratch resistant coatings on acrylic lenses and transparent glazing materials. This patent teaches that a preferred thickness for good scratch resistance is from 2 to 10 micrometers. U.S. Pat. No. 4,439,509 to Schank teaches photoconducing elements for electrophotography that have silsesquioxane coatings. The silsesquioxane overcoats have a thickness of from 0.5 to 2.0 micrometers. The patent indicates that this thickness optimizes electrical, transfer, cleaning and scratch resistance properties. This contrasts with U.S. Pat. No. 4,027,073, which teaches that a preferred thickness of a silsesquioxane layer, for good scratch resistance, is from 2 to 10 micrometers. U.S. Pat. No. 4,923,775 to Shank teaches that methylsilsesquioxane is preferred since it produces the hardest material in comparison to other alkylsilanes.

U.S. Pat. No. 4,595,602 to Schank teaches a conductive overcoat of cross-linked "siloxanol-colloidal silica hybrid" having a preferred thickness of from 0.3 to 5.0 micrometers. Cross-linkable siloxanol-colloidal silica hybrid was reacted with hydrolyzed ammonium salt of an alkoxy silane. The patent states:

> "the ionic moiety of the ammonium salt of an alkoxy silane is both uniformly distributed throughout the overcoating and permanently anchored in place thereby providing sufficient and stable electrical conductivity characteristics to the overcoating under a wide range of temperature and humidity conditions." (col. 6, lines 45–51)

The patent contrasts this with a overcoat layer having migratable ionic species:

> "By reacting these ammonium salts of alkoxy silanes with a cross-linkable siloxanol-colloidal silica hybrid material, the moisture sensitivity of the resulting films can be modified so that satisfactory control of the electrical properties of these overcoats can be achieved over an extended relative humidity range of about 10 percent to about 90 percent. Moreover, the overcoatings of this invention permit thicker protective coatings to be used thereby extending the useful life of the photoreceptor. It is hypothesized that when migratable ionic components such as conventional stabilizing acids and alkali metal catalysts are present in a cured cross-linked siloxanol-colloidal silica hybrid material overcoating, the photoreceptor may initially perform well under ordinary ambient conditions. However, upon extended xerographic cycling even under ordinary ambient conditions, repeated exposure to the applied electric field causes the migratable ionic components to migrate to the interface between the overcoating and the photoreceptor thereby forming a concentrated region or layer of ionic components which becomes progressively more electrically conductive. This electrically conductive interface region is believed to be the principal cause of print deletion, particularly at elevated temperatures and high humidity." (col. 6, lines 18–43)

Solid electrolytes, also referred to as solid ionic conductors, are solid materials in which electrical conductivity is provided by the motion of ions not electrons. A variety of solid electrolytes are inorganic crystals. Others are complexes of an organic polymer and a salt, such as complexes of poly(ethylene oxide) and alkali metal salt. "Electrolytes Dissolved in Polymers", J. M. G. Cowrie et al, *Annu. Rev. Phys. Chem.,* Vol. 40, (1989) pp. 85–113 teaches various solid electrolytes. "Solid Ionic Conductors", D. F. Shriver et al, *Chemical and Engineering News,* Vol. 63, (1985) pp. 42–57; teaches a number of solid electrolytes including a salt-polyphosphazene complex. "Polymer Electrolytes", J. S. Tonge et al, Chapter 5, *Polymers for Electronic Applications,* ed. J. H. Lai, CRC Press, Boca Raton, Fla., 1989, pp. 157–210, at 162; teaches solid electrolytes having highly flexible, low $T_g$ siloxane backbones. "Fast Ion Conduction in Comb Shaped Polymers", J. M. G. Cowrie, Integration of Fundamental Polymer Science and Technology, Vol. 2, Elsevior Publ., New York, (1988), pp. 54–62; also teaches a solid electrolyte having a siloxane backbone. Electrical surface conductivities for polymeric and inorganic solid ion conductors are in the range of about $1\times10^{-8}$ to 10 $(\text{ohms/sq})^{-1}$. (Surface conductivity is equal to conductivity divided by thickness and is expressed as $(\text{ohms/square})^{-1}$. Surface resistivity is equal to resistivity divided by thickness and is expressed as ohms/square. For example, a resistivity of $1\times10^{14}$ ohms-cm, for a layer having a thickness of 5 microns, equates to a surface resistivity of $2\times10^{17}$.) Solid electrolytes are used for applications including rechargeable lithium batteries, electrochemical sensors, and display devices. Polymeric solid electrolytes tend to be soft materials with little mechanical integrity.

A problem seen in siloxane and silane coatings is a tendency to crack with stress and aging. U.S. Pat. No. 4,227,287 to Frye teaches silicone polycondensates including polysiloxane polyether copolymers having a general structure that can be written:

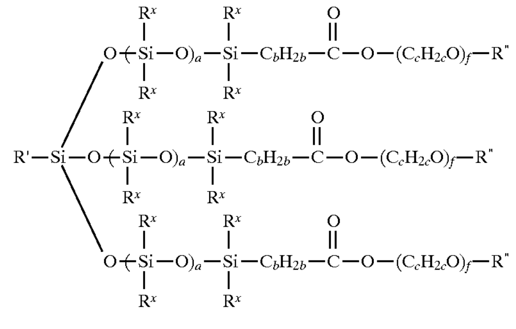

The patent teaches that the addition of about 4 weight percent of these copolymers to the total solids for a polysiloxane produces an aesthetically better coating that is less subject to stress cracking.

It is therefore desirable to provide antistatic elements, glassy solid electrolytes, and charge generating elements which provide both good resistance to abrasion and useful charge transport properties.

SUMMARY OF THE INVENTION

The invention, in its broader aspects, provides glassy solid electrolytes and charge transporting elements including antistatic elements and charge generating elements. The charge generating element has an electrically conductive layer, a charge generating layer overlying the electrically conductive layer, and a layer of glassy solid electrolyte overlying the electrically conductive layer. The glassy solid electrolyte includes a complex of silsesquioxane and a charge carrier. The complex has a surface resistivity from about $1\times10^{10}$ to about $1\times10^{16}$ ohms/sq. The complex has a $T^2$-silicon:$T^3$-silicon ratio of less than 1 to 1. The complex has a ratio of carbon atoms to silicon atoms of greater than about 1.2to 1.

It is an advantageous effect of at least some of the embodiments of the invention that antistatic elements, glassy solid electrolytes, and charge generating elements are provided which have both good resistance to abrasion and useful charge transport properties.

DESCRIPTION OF PARTICULAR EMBODIMENTS

The charge transporting elements of the invention have a support and a charge transporting layer. The charge generating elements of the invention have an electrically conductive layer, a charge generating layer, and a layer of the glassy solid electrolyte of the invention, as the charge transporting layer. The support can be the electrically conductive layer, but commonly is an additional layer. In different embodiments, the layers are varied and/or used in combination with other layers to provide a wide assortment of devices, such as photovoltaic elements, display devices, sensors and the like. Currently preferred charge generating elements of the invention are configured as electrophotographic elements. These elements are capable of charging positively or negatively and can take a wide variety of forms, as discussed in greater detail below.

In the charge generaton elements of the invention, the charge generating layer overlies the electrically conductive layer. The glassy solid electrolyte overlies the charge generating layer. In current embodiments of the invention, the glassy solid electrolyte has a thickness of from about 0.5 to about 10 micrometers, or, preferably from 1 to 10 micrometers. The charge generating element is described herein as if the element were in the shape of a horizontally disposed flat plate. It is to be understood, however, that the element is not limited to any particular shape and that directional terms refer only to relative positions, not an absolute orientation relative to the environment. The glassy solid electrolyte layer, for convenience, is also referred to herein as the "overcoat" layer of the charge generating element. This terminology should not be understood as limiting the scope of the charge generating element, nor even necessarily implying that the overcoat is uppermost, although this is highly preferred.

Previously known polymeric solid electrolytes have tended to be soft materials with little mechanical integrity and relatively low glass transition temperatures. In contrast, the glassy solid electrolyte disclosed herein is resistant to abrasion and has a relatively high glass transition temperature.

The glassy solid electrolyte is a complex of a silsesquioxane and an charge carrier. The prefix "sesqui-" refers to a one and one-half stoichiometry of oxygen and the "siloxane" indicates a silicon based material. Silsesquioxane can thus be represented by the general structure: $(RSiO_{1.5})_n$ where R is an organic group and n represents the number of repeating units. This formula, which is sometimes written $\{Si(O_{1/2})_3R\}_n$ is a useful shorthand for silsesquioxanes; but, except as to fully cured silsesquioxane, does not fully characterize the material. This is important, since silsesquioxanes can be utilized in an incompletely cured state. An additional nomenclature, derived from one described in R. H. Glaser, G. L Wilkes, C. E. Bronnimann; *Journal of Non-Crystalline Solids,* 113 (1989) 73–87; uses the initials M, D, T, and Q to designate silicon atoms bonded to 1, 2, 3, or 4 oxygen atoms, respectively. The designation T is subdivided as follows, to identify the number of bonds to other silicon atoms:

| Structure | Designation |
|---|---|
| 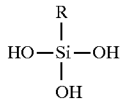 | $T^0$ |
| 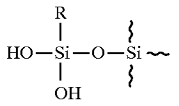 | $T^1$ |
| 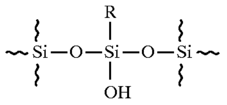 | $T^2$ |
| 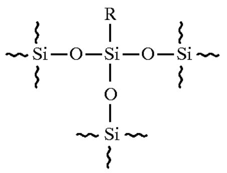 | $T^3$ |

For simplicity, OH groups are shown. The same designations apply to equivalent structures in which hydrolyzeable groups replace one or more hydroxyls.

In fully cured silsesquioxane, substantially all silicons are $T^3$. In partially cured silsesquioxanes, substantially all silicons are $T^2$ or $T^3$. This means that the extent of curing of the silsesquioxane can be quantified as the ratio of $T^2$ to $T^3$. This ratio is designated herein: "$T^2$-silicon/$T^3$-silicon ratio" or "$T^2/T^3$". The value of $T^2/T^3$ decreases with an increase in cure and vice versa.

The silsesquioxane of the glassy solid electrolyte has the general structure:

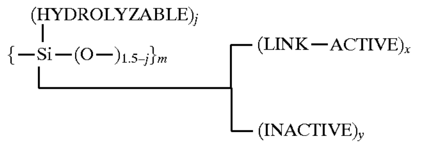

HYDROLYZABLE represents —OH or a "hydrolyzable moiety". The term "hydrolyzeable moiety" is used herein to refer to moieties that readily hydrolyze under the conditions employed during preparation of the polymeric electrolyte. The hydrolyzeable moieties in the polymeric electrolyte represent individual groups that were not hydrolyzed during preparation by reason of steric constraints or the like. Thus, in the glassy solid electrolyte, all but a small minority of hydrolyzable groups are OH. The following are examples of hydrolyzeable moieties: H; I; Br; Cl; alkoxy having from 1 to about 6 carbons; —O—Ar, where Ar is phenyl or aminophenyl; —(O-ALKYLENE)$_n$—O-ALKYL; where ALKYLENE is an alkylene group having from 2 to about 6 carbons, n is an integer from 1 to about 3, and ALKYL is an alkyl group having from 1 to about 6 carbons; primary and secondary amino having from one to about 6 carbon atoms; —N-(ALKYL)$_2$, where each ALKYL is alkyl having from 1 to about 6 carbons; —NH-(ALKYL), where ALKYL is alkyl having from 1 to about 6 carbons; —O—CO-ALKYL, where ALKYL is an alkyl having from 1 to 6 carbons.

It is preferred that substantially all HYDROLYZABLE moieties be —OH such that the above formula can be rewritten:

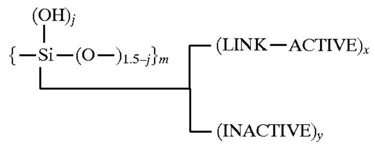

In these embodiments of the invention, an insubstantial portion of the subunits, about 5 mole percent or less, vary from this general formula. For example, in a small percentage of the subunits an OH group could be replaced by a hydrolyzeable moiety. Similarly, a small percentage of silicon atoms could bear two or three "non-hydrolyzeable" organic groups; or a small percentage of silicons could be replaced by another metal, such as aluminum; or a small percentage of silicons could bear organic groups not within the scope of the definitions of LINK-ACTIVE and INACTIVE.

The silsesquioxane is a relatively large oligomer or a polymer. The value of m, that is, the number of subunits, for the silsesquioxane is greater than 10. As the value of m is increased, the silsesquioxane becomes, in effect, a very large single molecule. Like highly cross-linked polymers, there is theoretically no upper limit on the number of subunits and the value of m can be a very large number.

The value of j corresponds to the mole percentage of $T^2$ silicons in the silsesquioxane relative to the total of $T^2$+$T^3$ silicons. In the glassy solid electrolyte of the invention, the value of j is less than 0.5 and greater than or equal to 0. This reflects a $T^2/T^3$ ratio of from 1:1 to 0:1. A preferred range for the $T^2/T^3$ ratio is from about 0.7:1 to about 0:1.

In the formulas for the silsesquioxane, x+y is substantially equal to 1. The values of x and y, that is, the relative molar concentrations of active subunits (silyl groups bearing a LINK-ACTIVE moiety) and inactive subunits (silyl groups bearing an -INACTIVE moiety), can be varied to provide a desired resistivity. In a particular embodiment of the invention in which the element is an electrophotographic element, active subunits preferably represent less than about 45 mole percent of the subunits of the polymer. In other words, x/(x+y) is less than about 0.45 and, in an embodiment in which x+y=1, x is from about 5 to about 45 mole percent and y is from about 95 to about 55 mole percent.

INACTIVE represents an aromatic or nonaromatic moiety having from 1 to about 12 carbons. INACTIVE moieties are not capable of participation in a siloxane polycondensation reaction and do not transport charge. The following monovalent or divalent moieties are examples of suitable moieties for INACTIVE: alkyl having from 1 to about 12 carbons, fluoroalkyl having from 1 to about 12 carbons, cycloalkyl having a single, 5 or 6 membered ring, and aryl ring systems having a single, 5 or 6 membered ring and from 5 to 12 carbons, including carbons of any substituents. Monovalent moieties are bonded to the Si atom of a single subunit of the polysilsesquioxane. Divalent moieties are bonded to the Si atoms of two subunits. INACTIVE moieties can all be the same or can differ. In the claimed invention, the average number of carbons in INACTIVE moieties is greater than 1, for example, INACTIVE moieties are not all methyl, but can be a mixture of methyl and one or more other moieties. Specific examples of monovalent INACTIVE moieties are: methyl, ethyl, n-propyl, isopropyl, n-butyl, isobutyl, t-butyl, n-decyl, perfluorooctyl, cyclohexyl, phenyl, dimethylphenyl, benzyl, napthyl, trimethylsiloxy. A divalent example is

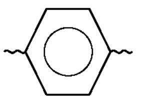

This INACTIVE group links two subunits of the silsesquioxane.

LINK represents divalent moieties corresponding to the monovalent moieties described above in relation to INACTIVE. In particular embodiments of the invention, LINK is selected from alkyl having from 1 to about 12 carbons, fluoroalkyl having from 1 to about 12 carbons; cycloalkyl having a single, 5 or 6 membered ring; and aryl having a single, 5 or 6 membered ring. Suitable LINK moieties include:

$-CH_2-$, $-CH_2-CH_2-$, $-CH_2-CH_2-CH_2-$,

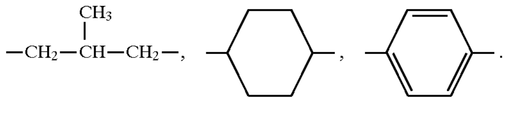

ACTIVE is a moiety that is complexed with the charge carrier. In preferred embodiments of the invention, ACTIVE is a monovalent organic moiety having O, S, or N and a total of carbons and heteroatoms from about 4 to about 20. Many ACTIVE moieties include one of the following groups: oxy, thio, ester, keto, imino, and amino. Suitable ACTIVE moieties, which complex cations, include neutral rings and chains of ethylene oxides and propylene oxides and tetramethylene oxides and ethylene imines and alkylene sulfides, glycidoxy ethers, epoxides, pyrolidinones, amino alcohols, amines, carboxylic acids and the conjugate salts, sulfonic acids and the conjugate salts. Suitable ACTIVE moieties, which complex anions, include ammonium salts, phosphonium salts, sulfonium salts, and arsonium salts.

In at least some embodiments of the invention, the ACTIVE moiety is a group that is capable of participation in a siloxane polycondensation reaction as a catalyst. Examples of such groups are primary, secondary, tertiary and quaternary amines. The concentration of catalytic active subunits can be varied to provide a convenient reaction rate. In some preferred embodiments of the invention, from about 0.5 to about 30 mole percent of the subunits in the polymer include the active moiety, $—(CH_2)_3—NH_2$.

The following are specific examples of -LINK-ACTIVE moieties:

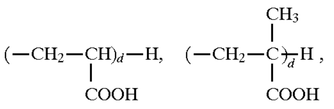

-continued

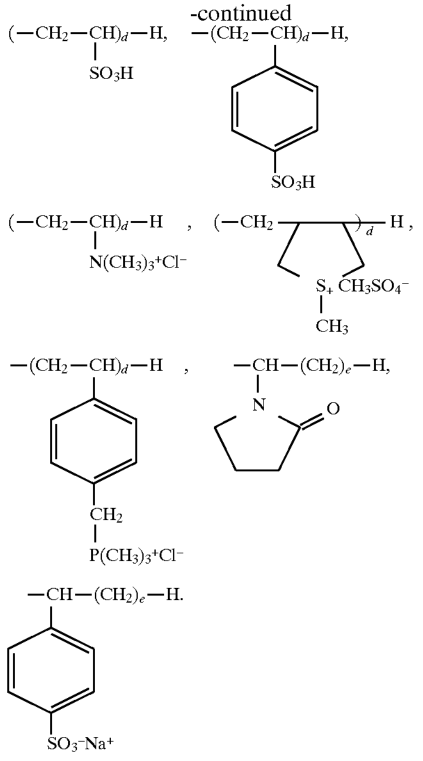

In the above, d and e are selected such that the total number of carbons in -LINK-ACTIVE is from 4 to about 25.

The following are specific examples of -ACTIVE moieties:

$-(O-(CHR)_e)_d-H$, wherein eis from 2 to 5, $-(S-(CHR)_e)_d-H$ wherein e is from 2 to 5, $-NR_2$, $-(N-CH_2-CH_2)_n-NR_2$, 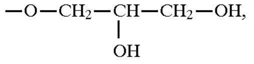

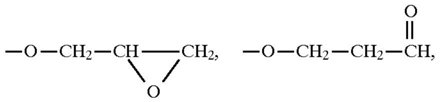

$\{CHOH-(CH_2)_x\}_n$ wherein x = 2–6 and n = 2–6, $-CO-NR-$, 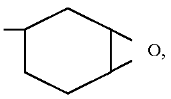 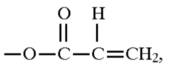

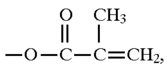 and 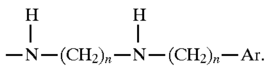

In the above, unless otherwise indicated, R is H, alkyl, or fluoroalkyl having from 1 to about 12 carbons, n is from 1 to about 12, X is Cl, Br, or I, Ar is aryl having a single 5 or 6 membered ring, and the total number of carbons in -LINK-ACTIVE is from 4 to about 25. Specific examples of some -LINK-ACTIVE moieties include: aminopropyl, dimethylaminopentyl, propylethylene diamine, propylethylene triamine, 3-glycidoxypropyl, 2-(3,4-epoxycyclohexyl) ethyl, 3-acryloxypropyl, 3-methacryloxypropyl, and N-(2-(vinylbenzylamino)ethyl)-3-aminopropyl.

Some considerations apply to both active and inactive subunits of the silsesquioxane. The glassy solid electrolyte can include a mixture of different active subunits or a mixture of different inactive subunits or mixtures of both. The moieties: -LINK-ACTIVE and -INACTIVE should not be substantially hydrolyzed in the siloxane polycondensation reaction used to prepare the glassy solid electrolyte, since the organic substituents would be lost and the resulting polymer would exhibit a very high degree of cross-linking. The moieties: -LINK-ACTIVE and -INACTIVE should not be so large as to cause steric problems. For example, a suitable maximum for the number of carbon and heteroatoms in a –LINK-ACTIVE moiety is 25 and for -INACTIVE moiety is 12.

The charge carrier is selected in tandem with the selection of an ACTIVE moiety. The term “charge carrier” is used herein to describe a substance that complexes with the ACTIVE moiety to yield a mobile species or combination of species that carries charge within the glassy solid electrolyte of the invention. The charge carrier can be a salt or mixture of salts. The mobile species is one or both ions of the salt or one or both ions of the various salts of the mixture. The charge carrier can also be or can include a substance that, as an isolated material, is not a salt. An example of the latter charge carrier is the complexation product of molecular iodine. This type of charge carrier provides a mobile species that forms a donor-acceptor or charge-transfer complex with the ACTIVE moiety in which the resulting charge separation has substantial ionic character.

A wide variety of charge carriers can be used. Selection of a suitable charge carrier for a particular use is a matter of relatively simple trial and error. The charge carrier must be capable of forming a complex with the ACTIVE moiety such that the silsesquioxane-charge carrier complex is electrically conducting. In preferred embodiments of the invention, the charge carrier must be capable of forming a complex with the ACTIVE moiety such that the silsesquioxane-charge carrier complex is electrically conducting in the absence of moisture. For salts, this is commonly described as “dissolving in the matrix”. An explanation of this “dissolving” can be provided. Using an example in which ACTIVE is a heteroatomic group and the charge carrier is a salt in which both ions are mobile, it is believed that the “dissolving” is due to the heteroatom acting as a Lewis base or Lewis acid to break up the ion pairing of the low lattice energy salt. The unpaired ions of the salt are free to move from one heteroatom to another to form an ionic conductor. The claimed invention is not, however, limited by any explanation or theory.

Complex formation with a particular ACTIVE moiety can be determined by a variety of means. For example, “Conductivity of solid complexes of lithium perchlorate with poly{[ω-methyoxyhexa-(oxyethylene)ethoxy]methylsiloxane}”, D. Fish et al, *Makromol. Chem., Rapid Commun.* Vol. 7, (1986) pp. 115–120; teaches that complex formation can be tracked by measuring the increase in glass transition temperature ($T_g$) as the amount of salt or other charge carrier in the polymer is increased. Care must be taken to account for changes in $T_g$ due to curing during the analysis.

Suitable charge carriers can be selected from materials useful in other solid electrolytes. “Electrolytes Dissolved in Polymers”, J. M. G. Cowrie, et al, *Annu. Rev. Phys. Chem.*, Vol. 40, (1989), pp. 85–113, at 87; indicates that useful salts tend to have a low lattice energy or a large anion or both such that the salt will dissolve in the polymer matrix. This article provides the following table of suitable salts for polyethylene oxide based glassy solid electrolytes.

“A comparison of the tendency for miscible PEO-salt mixtures to form and the lattice energies of the salts. Values in parentheses are either estimated or calculated theoretically.

| | $Li^+$ | $Na^+$ | $K^+$ | $Rb^+$ | $Cs^+$ |
|---|---|---|---|---|---|
| $F^-$ | No | No | No | No | No |
| | 1036 | 923 | 821 | 785 | 740 |
| $Cl^-$ | Yes | No | No | No | No |
| | 853 | 786 | 715 | 689 | 659 |
| $CH_3COO^-$ | — | No | — | — | — |
| | 881 | 763 | 682 | 656 | (682) |
| $NO_3^-$ | — | No | — | — | No |
| | 848 | 756 | 687 | 658 | 625 |
| $NO_2^-$ | — | No | — | — | — |
| | — | 748 | 664 | 765 | (598) |
| $Br^-$ | Yes | Yes | No | No | No |
| | 807 | 747 | 682 | 660 | 631 |
| $N_3^-$ | — | No | — | — | — |
| | 818 | 731 | 658 | 632 | 604 |
| $BH_4^-$ | — | Yes | — | — | — |
| | (778) | (703) | (665) | (648) | (628) |
| $I^-$ | Yes | Yes | ? | No | No |
| | 757 | 704 | 644 | 630 | 604 |
| $SCN^-$ | Yes | Yes | Yes | Yes | Yes |
| | 807 | 682 | 616 | 619 | 568 |
| $ClO_4^-$ | Yes | Yes | — | — | — |
| | 723 | 648 | 602 | 582 | 542 |
| $CF_3SO_3^-$ | Yes | Yes | Yes | Yes | Yes |
| | (≦725) | (≦650) | (≦605) | (≦585) | (≦550) |
| $BF_4^-$ | Yes | Yes | — | — | — |
| | (699) | 619 | 631 | 605 | (556) |
| $BPh_4^-$ | Yes | Yes | Yes | Yes | Yes |
| | (≦700) | (≦630) | (≦630) | (≦600) | (≦550) |

(end of quote)

It is expected that this table (referred to herein as “Table I”) can be used to define salts useful in the invention both in terms of the salts specifically listed and in terms of salts having a cation and an anion of an equivalent size and a similar lattice energy. This table is not all inclusive of suitable salts. Salts such as ammonium halides and hydroxide and quaternary ammonium salts are also expected to be suitable candidates as low lattice energy salts. This table is for salts in mixture with polyethylene oxide. Comparable tables could be prepared for other ACTIVE groups by testing for complex formation as above-discussed. Such tables are expected to be similar to, but necessarily the same as the above PEO-salt table. For example, CsI is on the “borderline” in Table 1 between suitable and unsuitable salts and is not a suitable charge carrier with PEO; but it is expected that an ACTIVE moiety could be readily determined, with which CsI would act as a charge carrier. The resulting solid electrolyte would be expected to have lower conductivity than a similar solid electrolyte having a “suitable” salt from Table 1 (those salts indicated by a “Yes”).

The charge carrier and ACTIVE moiety are selected to provide a particular electrical conductivity, and its inverse, resistivity, under conditions of low ambient relative humidity (except in embodiments where water provides the charge carrier). Particular ranges are desirable for solid electrolyes used for number of different purposes. For example, a glassy solid electrolyte used as an overcoat of an electrophotographic element has a desirable surface resistivity for the polymer-electrolyte layer of from about $1\times10^{10}$ ohms/sq to about $1\times10^{17}$ ohms/sq; or, more desirably, a surface resistivity of from about $1\times10^{14}$ ohms/sq to about $1\times10^{17}$ ohms/sq.

The charge carrier and ACTIVE moiety can also be selected so as to provide other characteristics desired in a particular embodiment of the invention. For example, the charge carrier used in a glassy solid electrolyte overcoat of an electrophotographic element, can be selected to provide particular tribocharging characteristics, both in terms of polarity and placement in a triboelectric series relative to toner and carrier materials.

For another example, the charge carrier and ACTIVE moiety can be selected such that "blooming" is eliminated or reduced. Ammonium salts can be used as charge carriers; however, these salts "bloom", that is, migrate to the surface of a solid electrolyte resulting in an enhanced degree of ammonium activity on the surface or in an upper layer. (Ammonium salts are commonly used to cure silsesquioxanes. Blooming is a recognized shortcoming of that procedure.) In uses such as electrophotography, blooming is undesirable since it may cause variability in electrophotographic properties, leading to problems such as image artifacts. A charge carrier can be selected that is non-blooming or resistant to migration. The "curing" or catalytic function that would otherwise be provided the ammonium salts can be provided by selection of an ACTIVE moiety that is a siloxane polycondensation catalyst. The ACTIVE moiety is not mobile within the solid electrolyte, thus does not bloom.

The charge carrier can be an inorganic or organic alkali salt, one or both ions may be mobile in the complex. Suitable such salts include: LiCl, $CH_3COO$-Li, $LiNO_3$, $LiNO_2$, LiBr, $LiN_3$, $LiBH_4$, LiI, LiSCN, $LiClO_4$, $LiCF_3SO_3$, $LiBF_4$, $LiBPh_4$, NaBr, $NaN_3$, $NaBH_4$, NaI, NaSCN, $NaClO_4$, $NaCF_3SO_3$, $NaBF_4$, $NaBPh_4$, KSCN, $KClO_4$, $KCF_3SO_3$, $KBF_4$, $KBPh_4$, RbSCN, $RbClO_4$, $RbCF_3SO_3$, $RbBF_4$, $RbBPh_4$, CsSCN, $CsClO_4$, $CsCF_3SO_3$, $CsBF_4$, $CsBPh_4$. ("Ph" used herein represents phenyl.) These salts are highly resistant to blooming when used with the silsesquioxanes disclosed in the Examples. Other suitable salts include: quaternary ammonium salts, ammonium hydroxide, and ammonium halides. These salts and the other salts previously listed can be used individually or in combination.

A suitable concentration of charge carrier is from about 0.1 to 10 weight percent relative to the weight of the silsesquioxane.

A currently preferred charge carrier is LiI. A currently preferred concentration is from about 0.5 to 2 weight percent relative to the weight of the silsesquioxane. LiI is readily soluble in alcohols, and does not display the surface activity of ammonium salts. In particular embodiments of the invention, LiI also acts as a catalyst for the ring opening of epoxide groups of glycidoxypropyl substituents in reactants to give a silsesquioxane in which the ACTIVE groups are the corresponding diol. In other currently preferred embodiments of the invention, the charge carrier is a mixture of LiI and 12. A suitable mixture has an $I_2$ concentration of less than I mole percent relative to the number of moles of silyl units.

The charge carrier can be water. In a particular embodiment of the invention, the mobile species is the hydrogen ion and the ACTIVE group hydrolyzes in the presence of water to yield mobile hydrogen ions. The solid electrolyte has useful properties and can be used as an overcoat on an electrophotographic element. This solid electrolyte has the shortcoming, however, of conductivity that varies with ambient humidity. Under low humidity conditions, the charge carrier is absent, such that the material is no longer a solid electrolyte, but simply a layer of inorganic oxide polymer.

In particular embodiments of the charge generating element of the invention, the silsesquioxane polymer has the general formula:

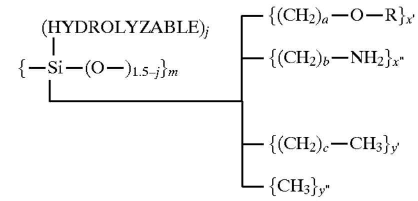

In this equation HYDOLYZABLE has the same meaning as above indicated and is preferably OH. j and m have the same values as above-described. R is

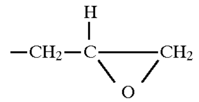 or 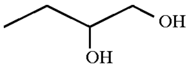 or

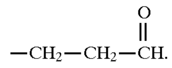

a, b, c, x', x", y', and y" have values in the ranges above-discussed in relation to -LINK-ACTIVE and -INACTIVE moieties. In some embodiments of the invention, a is from 1 to about 5, b is is from 1 to about 5, c is from 1 to about 6, x' is from about 5 to about 45 mol %, x" is from about 1 to about 45 mol %, x'+x" is from about 5 to 45, y' is from about 0 to about 95 mol %, and y" is from about 0 to about 95 mol %, and y'+y" is from about 95 to about 55 mol %.

It is currently preferred that the solid electrolyte have a C:Si ratio of greater than about 1.1:1 and a $T^2$:$T^3$ ratio of less than about 0.6:1; or, more preferably, a C:Si ratio of greater than about 1.2:1 and a $T^2$:$T^3$ ratio of less than about 0.6:1. The solid electrolytes, so defined, vary in terms of abrasion resistance, brittleness, and resistivity. It has been ascertained that the primary determinants, among various competing factors, are the organic groups of the silsesquioxane and the extent of cure. A decrease in organic content correlates with an increase in abrasion resistance, but also correlates with an increase in brittleness. An increase in methyl content and an accompanying decrease in ACTIVE groups correlates with an increase in intrisic resistivity. An increase in organic content correlates with an increase in resistivity. As a general rule, charge carrier concentration can be increased to compensate for an increase in intrinsic resistivity, but not an increase in resistivity associated with an increase in organic content. An increase in charge carrier concentration can increase the variability of resistance with changes in ambient relative humidity. Curing is increased by increasing the concentration of a charge carrier that catalyzes curing. An increase in cure is associated with an increase in brittleness. Higher brittleness correlates with higher effective stress in a coating. A relatively higher effective stress can be compensated for by decreasing the coating thickness.

In some preferred solid electrolytes suitable for use in charge generating elements, the C:Si ratio is greater than about 2:1 and the $T^2$:$T^3$ ratio is from about 0.5:1 to about 0.3:1. The following formula is an example of a silsesquioxane useful in such embodiments:

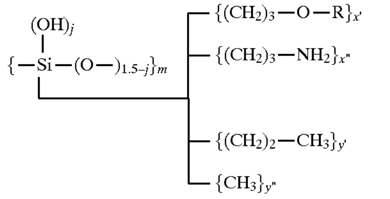

In this formula, m and R have the same meanings as indicated above, j is from about 0.4 to about 0.5; x' is from about 5 to about 30 mol %; x" is from about 2 to about 10 mol %; y' is from about 40 to about 90 mol %; and y" is from about 0 to about 55 mol %. These solid electrolytes demonstrate good flexibility and resistivities for use as overcoat layers on electrophotographic element. The silsesquioxane is not fully cured, thus useful life may be limited by changes in brittleness and resistivity associated with further curing that occurs as the solid electrolyte ages.

In some preferred solid electrolytes suitable for use in charge generating elements, the C:Si ratio is greater than about 1.2:1 and the $T^2$:$T^3$ ratio is less than about 0.5:1, or more preferably less than about 0.4:1 The following formula is an example of a silsesquioxane useful in such embodiments:

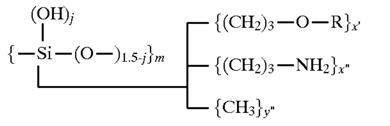

In this formula, m and R have the same meanings as indicated above, j is from about 0.4 to about 0.5; x' is from about 5 to about 30 mol %; x" is from about 2 to about 10 mol %; and y" is from about 60 to about 90 mol %. These solid electrolytes demonstrate increased brittleness as the amount of cure increases, but also increased hardness. These solid electrolytes are useful as relatively thin (for example 2 micrometers thick), relatively high resistivity overcoat layers on electrophotographic elements. The silsesquioxane is not fully cured.

In some preferred solid electrolytes suitable for use in charge generating elements, the C:Si ratio is greater than about 1.2:1 and the $T^2$:$T^3$ ratio is less than about 0.1:1, or more preferably less than about 0.05:1, or still more preferably, substantially equal to 0:1. The following formula is an example of a silsesquioxane useful in such embodiments:

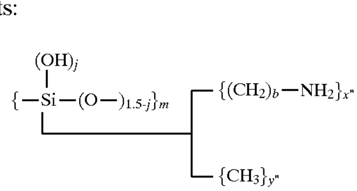

In this formula, m has the same meaning as indicated above; j is from about 0 to about 0.15; x" is from about 10 to about 40 mol %; and y" is from about 0 to about 90 mol %. These solid electrolytes demonstrate good resistivities and acceptable brittleness for use as overcoat layers on electrophotographic element. These solid electrolytes are moderately brittle, but have the advantage that they are fully or nearly fully cured and are thus very stable.

In many of the solid electrolytes disclosed herein, abrasion resistance and brittleness are complementary, such that an increase in one results in a corresponding decrease in the other. In solid electrolytes having alkylamine substituents, this paradigm can be broken by replacing some of the charge carrier with molecular iodine. The result is a solid electrolyte having increased abrasion resistance relative to the same solid electrolyte having a comparable concentration of charge carrier, but lacking molecular iodine. An explanation can be provided for this phenomenon; the claimed invention is not, however, limited by any particular theory or explanation. The oxidation of alkylamine by iodine has been reported. (D. H. Wadsworth et al., *J. Org. Chem.* (1984) Vol. 49, p. 2676) It is thought that, during the siloxane polycondensation reaction, the molecular iodine cleaves aminoalkylsilane groups so as to free the amine as ammonia. The iodine is simultaneously reduced to iodide, which then acts as a charge carrier. The ammonia is believed to diffuse to the surface and raise the cure level before the ammonia leaves the coating. There is believed to be a differential in reactivity between the surface and the interior, such that the surface becomes more cured and thus harder, while the interior remains comparatively less cured and thus more flexible. This differential is not fully understood; however, it does correlate well with actual observations.

The glassy solid electrolyte of the invention can include a wide variety of addenda such as fillers, like metal oxide particles and beads of organic polymer. Fillers can be added to modify some of the properties of the resulting glassy solid electrolyte. For example, metal oxide particles could be added to increase abrasion resistance. Fluorocarbon polymer beads could be added to reduce frictional loads on the surface. Filler is added in a concentration that is small enough to not cause deleterious changes in the physical properties of the glassy solid electrolyte. Some fillers can be covalently bonded into the overall matrix of the silsesquioxane. These materials can be expected to show a greater degree of physical integrity at high concentrations of filler, than filler that do not covalently bond into the silsesquioxane matrix. An example of a material the covalently bonds into the silsesquioxane matrix is a colloidal hydrophilic silica, such as basic Ludox™ marketed by DuPont.

In particular embodiments of the invention, the glassy solid electrolyte includes what is referred to herein as a "secondary active agent". The secondary active agent is a non-silsesquioxane compound that includes one or more ACTIVE moieties. The ACTIVE moieties are selected from those defined above for the silsesquioxane. In a particular solid electrolyte, the ACTIVE moieties of the secondary active agent can be the same or different than those of the silsesquioxane and a single secondary active agent or a number of different secondary active agents can be present in the solid electrolyte. The secondary active agent may or may not be involved in charge transport. If the secondary active agent is involved, the additional transport provided increases conductivity less than about about 5 or 10 percent. The secondary active agent can provide additional functions. For example, a secondary active agent could also function as a plasticizer.

In particular embodiments of the invention, the glassy solid electrolyte include an alcohol soluble surfactant. Suitable classes of surfactants include siloxane-alkylene oxide copolymers sold by Dow Corning and OSi Specialties (formerly Union Carbide). These materials act as plasticizers and lubricants and are secondary active agents. Also useful are cationic surfactants such as FC-135™ by 3M, which contains a tetra-alkylammonium iodide as the cationic moiety. This material provides charge carrier, with iodide ions as the mobile species, and includes tetra-alkyl ammonium ACTIVE moieties. Also useful are anionic surfactants, such as those sold under the trade name Triton™, Aerosol™ and Alipal™. These surfactants contain sodium salt moieties which can act as charge carriers, that is, the sodium salt moieties can ionize in the solid electrolyte to provide low lattice energy salts as mobile species. Also useful are the Zonyl FSN surfactants from DuPont, which contain ethylene oxide ACTIVE moieties and iodide salts.

In a particular embodiment of the invention, the surfactant is a poly(alkylene oxide)-co-poly(dimethylsiloxane). A specific example of such a surfactant has the general formula:

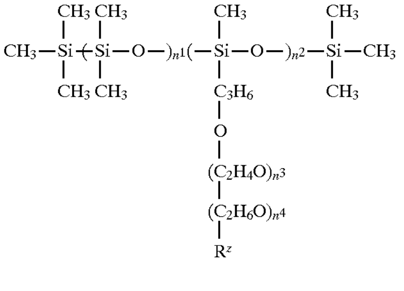

$R^Z$ can be either hydrogen or a lower alkyl radical, according to product literature on the SILWET™ Surface Active Copolymers from OSi Specialties, Inc. A specific example of a surfactant suitable for use in the method of the invention is a material marketed as a "lubricant" by OSi Specialties, Inc. of Danbury, Conn., U.S.A. under the designation: Silwet L-7002.

In particular embodiments of the invention, the glassy solid electrolyte includes a plasticizer. Currently preferred are plasticizers that are incorporated into the silsesquioxane matrix. Examples of classes of suitable plasticizers include: alkyl-tri(polysiloxane polyether copolymers)silanes, which are similar in structure to the surfactants above, but are bulkier and tend to stay in the bulk of the silsesquioxane to a greater degree. An example of a suitable alkyl-tri (polysiloxane polyether copolymers) silane is the material identified in the earlier discussion of U.S. Pat. No. 4,227, 287. Materials having this formula are available commercially from OSi Specialties, Inc. of Danbury, Conn. under the designation L-540™; and from Dow Corning Corporation of Midland, Mich. under the designation DC-190™. Suitable concentrations are from about 0.5 to 6 parts by weight based on the weight of the silsesquioxane.

Another plasticizer or lubricant is trimethylsiloxyl terminated poly(dimethylsiloxane) having a molecular weight of less than about 5,000 and preferably having a molecular weight from about 300 to about 3000.

Other plasticizers that would remain free to migrate within the silsesquioxane polymer that are not currently preferred, but can be added in amounts small enough to not unacceptably degrade the physical and electrical properties of the resulting element are nylons, such as Elvamide 9061™ and Elvamide 8064™, marketed by E.I. du Pont de Nemours & Co., of Wilmington, Del.

In particular electrophotographic elements of the invention, the solid electrolyte includes a Lewis base which acts as an acid scavenger. As a practical matter, the acid scavenger should be soluble in the solution used to prepare the silsesquioxane. Examples of suitable materials include: amines, including arylamines and substituted arylamines.

The glassy solid electrolyte is prepared in a manner similar to the preparation of a silsesquioxane. Silsesquioxanes are a class of inorganic/organic glasses which can be formed at moderate temperatures by a type of procedure commonly referred to as a "sol-gel" process. In the sol-gel process, silicon alkoxides are hydrolyzed in an appropriate solvent, forming the "sol"; then the solvent is removed resulting in a condensation and the formation of a cross-linked gel. A variety of solvents can be used. Aqueous, aqueous-alcoholic, and alcoholic solutions are generally preferred. Silsesquioxanes are conveniently coated from acidic alcohols, since the silicic acid form $RSi(OH)_3$ can be stable in solution for months at ambient conditions. The charge carrier is added, in an appropriate concentration along with any addenda, prior to the polycondensation reaction. The extent of condensation is related to the amount of curing a sample receives, with temperature and time being among the two most important variables.

In the preparation of the glassy solid electrolyte of the invention, the silicon alkoxides include -LINK-ACTIVE and -INACTIVE moieties in the proportions desired in the resulting silsesquioxane. For example, the following are some silicon alkoxides that include catalytic -LINK-ACTIVE moieties: 3-aminopropyltrimethoxysilane; 3-aminopropyltriethoxysilane; 3-aminopropylmethyldiethoxysilane; 3-aminopropyldimethylethoxysilane; 3-aminopropyldiisopropylethoxysilane; 3-aminopropyltris (methoxyethoxyethoxy) silane; 3-(1-aminopropoxy)-3,3-dimethyl-1-propenyltrimethoxysilane; N-(6-aminohexyl) aminopropyltrimethoxysilane; N-2-(aminoethyl)-3-aminopropyltris(2-ethylhexoxy)silane; N-(2-aminoethyl)-3-aminopropyltrimethoxysilane; N-(2-aminoethyl)-3-aminopropylmethyldimethoxysilane; (aminoethylaninomethyl) phenethyltrimethoxysilane; 4-aminobutyltriethoxysilane; (N,N-dimethyl-3-aminopropyl)trimethoxysilane; N-methylaminopropyltrimethoxysilane; N-[(3-trimethoxysilyl)propyl]ethylenediamine triacetic acid trisodium salt; N-trimethoxysilylpropyl-N,N,N-trimethylammonium chloride; N-trimethoxysilylpropyltri-N-butylammonium bromide.

Particular charge generating elements of the invention include primer bonded between the charge generating layer and the layer of glassy solid electrolyte. The primer is selected so as to provide a good mechanical bond between the charge generating layer and the layer of glassy solid electrolyte, but not interfere with charge related properties. The thickness of the primer layer is from about 0.1 micrometer to about 1.0 micrometer and is preferably less than 0.5 micrometers. It is important that neither the primer, nor the solvent the primer is coated from, damage the photoconducting layers. Suitable solvents include lower alcohols. Suitable primers include polymers that are either soluble in these solvents or that form emulsions. Examples of classes of suitable primers include: acrylics, polyurethanes, pyrrolidones, polyamides, polyesters, and inorganic alkoxide including silane coupling agents. A preferred example of a specific primer is a methacrylate-methylmethacrylate-methacrylic acid latex, the synthesis of which is described below. Another example of a specific primer is a copolymer of poly(vinylpyrrolidone-methacrylic acid) (95/5)wt. Molecular iodine or iodide salt can be added to this material to produce a conductive layer between the silsesquioxane and the substrate. Another example of a specific primer is partially hydrolyzed aminopropyltrimethoxysilane.

The electrophotographic elements of the invention can be of various types, including both those commonly referred to as single layer or single-active-layer elements and those commonly referred to as multiactive, or multiple-active-layer elements. All of the electrophotographic elements of the invention have multiple layers, since each element has at least an electrically conductive layer and one photogenerating (charge generating) layer, that is, a layer which includes a charge generation material, in addition to a solid electrolyte overcoat layer.

Single-active-layer elements are so named because they contain only one layer, referred to as the photoconductive layer, that is active both to generate and to transport charges in response to exposure to actinic radiation. Such elements have an additional electrically conductive layer in electrical contact with the photoconductive layer. In single-active-layer elements of the invention, the photoconductive layer contains charge-generation material to generate electron/hole pairs in response to actinic radiation and a charge-transport material, which is capable of accepting electrons or holes generated by the charge-generation material and transporting them through the layer to effect discharge of the initially uniform electrostatic potential. The charge-transport agent and charge generation material are dispersed as uniformly as possible in the photoconductive layer. The photoconductive layer also contains an electrically insulative polymeric film-forming binder. The photoconductive layer is electrically insulative except when exposed to actinic radiation.

Multiple-active-layer elements are so named because they contain at least two active layers, at least one of which is capable of generating charge, that is, electron/hole pairs, in response to exposure to actinic radiation and is therefore referred to as a charge-generation layer (CGL), and at least one of which is capable of accepting and transporting charges generated by the charge-generation layer and is therefore referred to as a charge-transport layer (CTL). In the invention, multiple-active-layer elements have an electrically conductive layer, a CGL, a CTL, and an overcoat layer. Either the CGL or the CTL is in electrical contact with both the electrically conductive layer and the remaining CTL or CGL. The CGL contains charge-generation material and a polymeric binder. The CTL contains a charge-transport agent and a polymeric binder.

Single-active-layer and multiactive layer electrophotographic elements and their preparation and use in general, are well known and are described in more detail, for example, in U.S. Pat. Nos. 4,701,396; 4,666,802; 4,578,334; 4,719,163; 4,175,960; 4,514,481 and 3,615,414, the disclosures of which are incorporated herein by reference.

In preparing the electrophotographic elements of the invention, the components of the photogeneration layer, including binder and any desired addenda, are dissolved or dispersed together in a liquid to form an electrophotographic coating composition which is then coated over an appropriate underlayer, for example, a support or electrically conductive layer. The liquid is then allowed or caused to evaporate from the mixture to form the permanent photoconductive layer or CGL.

The polymeric binder used in the preparation of the coating compositions can be any of the many different binders that are useful in the preparation of electrophotographic layers. The polymeric binder is a film-forming polymer having a fairly high dielectric strength. In a preferred embodiment of the invention, the polymeric binder also has good electrically insulating properties. The binder should provide little or no interference with the generation and transport of charges in the layer. The binder can also be selected to provide additional functions. For example, adhering a layer to an adjacent layer; or, as a top layer, providing a smooth, easy to clean, wear-resistant surface. Representative binders are film-forming polymers having a fairly high dielectric strength and good electrically insulating properties. Such binders include, for example, styrene-butadiene copolymers; vinyl toluene-styrene copolymers; styrene-alkyd resins; silicone-alkyd resins; soya-alkyd resins; vinylidene chloride-vinylchloride copolymers; poly(-vinylidene chloride); vinylidene chloride-acrylonitrile copolymers; vinyl acetate-vinyl chloride copolymers; poly (vinyl acetals), such as poly(vinyl butyral); nitrated polystyrene; poly(methylstyrene); isobutylene polymers; polyesters, such as poly{ethylene-coakylenebis (alkyleneoxyaryl) phenylenedicarboxylate}; phenol-formaldehyde resins; ketone resins; polyamides; polycarbonates; polythiocarbonates; poly{ethylen-coisopeopyliden-2,2-bis(ethylenoxyphenylene)-terephthalate}; copolymers of vinyl haloacrylates and vinyl acetate such as poly(vinyl-m-bromobenzoate-covinyl acetate); chlorinated poly(olefins), such as chlorinated poly (ethylene); cellulose derivatives such as cellulose acetate, cellulose acetate butyrate and ethyl cellulose; and polyimides, such as poly{1,1,3-trimethyl-3-(4'-phenyl)-5-indane pyromellitimide}. Examples of binder polymers which are particularly desirable from the viewpoint of minimizing interference with the generation or transport of charges include: bisphenol A polycarbonates and polyesters such as poly[(4,4'-norbornylidene)diphenylene terephthalate-co-azelate].

Suitable organic solvents for forming the polymeric binder solution can be selected from a wide variety of organic solvents, including, for example, aromatic hydrocarbons such as benzene, toluene, xylene and mesitylene; ketones such as acetone, butanone and 4-methyl-2-pentanone; halogenated hydrocarbons such as dichloromethane, trichloroethane, methylene chloride, chloroform and ethylene chloride; ethers including ethyl ether and cyclic ethers such as dioxane and tetrahydrofuran; other solvents such as acetonitrile and dimethylsulfoxide; and mixtures of such solvents. The amount of solvent used in forming the binder solution is typically in the range of from about 2 to about 100 parts of solvent per part of binder by weight, and preferably in the range of from about 10 to 50 parts of solvent per part of binder by weight.

In the coating compositions for the CGL or photoconductor layer, the optimum ratios of charge generation material or of both charge generation material and charge transport agent, to binder can vary widely, depending on the particular materials employed. In general, useful results are obtained when the total concentration of both charge generation material and charge transport material in a layer is within the range of from about 20 to about 90 weight percent, based on the dry weight of the layer. In a preferred embodiment of a single active layer electrophotographic element of the invention, the coating composition contains from about 10 to about 70 weight percent of a charge-generation material and from 10 to about 90 weight percent of charge transport material. In a preferred embodiment of a multiple active layer electrophotographic element of the invention, the coating composition contains from 20 to 80 weight percent of charge generation material and from 20 to 60 weight percent of charge-transport material.

Polymeric binders and charge transport materials and concentrations useful for the CGL or photoconductor layer are also useful for a CTL. The CTL can be solvent coated in the same manner as the charge generating layer. The coating composition can utilize the same solvents as in the charge generating layer. A similar process, preparing and then coating an appropriate coating composition, can be followed for charge transport layers.

Any charge generation and transport materials can be utilized in elements of the invention. Such materials include inorganic and organic (including monomeric organic, metallo-organic and polymeric organic) materials); for example, zinc oxide, lead oxide, selenium, phthalocyanine, perylene, arylamine, polyarylalkane, and polycarbazole materials, among many others.

CGL's and CTL's in elements of the invention can optionally contain other addenda such as leveling agents, surfactants, plasticizers, sensitizers, contrast control agents, and release agents, as is well known in the art.

Various electrically conductive layers or supports can be employed in electrophotographic elements of the invention, for example, paper (at a relative humidity above 20 percent) aluminum-paper laminates; metal foils such as aluminum foil, zinc foil, and the like; metal plates such as aluminum, copper, zinc, brass and galvanized plates; vapor deposited metal layers such as silver, chromium, vanadium, gold, nickel, aluminum and the like; and semiconductive layers such as cuprous iodide and indium tin oxide. The metal or semiconductive layers can be coated on paper or conventional photographic film bases such as poly(ethylene terephthalate), cellulose acetate, polystyrene, etc. Such conducting materials as chromium, nickel, etc. can be vacuum-deposited on transparent film supports in sufficiently thin layers to allow electrophotographic elements so prepared to be exposed from either side.

Electrophotographic elements of the invention can include various additional layers known to be useful in electrophotographic elements in general, for example, subbing layers, barrier layers, and screening layers.

The antistatic elements of the invention have a charge transporting layer differing from the compositions of the glassy solid electrolytes above-described in that the charge carrier and ACTIVE moiety, and their concentrations, are selected to provide a surface resistivity for the charge transporting layer of from about $1\times10^6$ ohms/sq to about $1\times10^{10}$ ohms/sq; or, more desirably, a surface resistivity of about $1\times10^8$ ohms/sq.

The antistatic elements have a support selected from the wide variety of materials for which it is desired to decrease resistivity. For example, the support can be polymeric, such as poly(ethylene terephthalate), cellulose acetate, polystryrene, or poly(methyl methacrylate). The support can be glass, resin-coated paper, other papers, or metal. Fibers, including synthetic fibers useful for weaving into cloth, can be used in the support. Suitable supports may be planar, but are not limited to articles of any particular three dimensional shape.

The antistatic elements can be photographic elements. In elements of this type, at least one radiation-sensitive layer overlies the support. The charge transporting layer can be in any position on the support and the support can include multiple charge transporting layers. In the case of multiple charge transporting layers, it is preferred that each of those layers have the composition above-described. The radiation-sensitive layers can have a wide variety of forms. Suitable layers include: photographic silver emulsions, such as silver halide emulsions; diazo-type compositions, vesicular image-forming compositions; photopolymerizable compositions; electrophotographic compositions including radiation sensitive semiconductors; and the like. Suitable photographic silver halide emulsions including, but not limited to, single or multi-layer, black-and-white or color, with or without incorporated couplers are described, for example, in *Research Disclosure,* Item 17643 (Silver Halide Elements), December 1978, pages 22–31 and *Research Disclosure,* Item 18431 (Radiographic Elements), August 1979, pages 431–441. The photographic elements can include various additional layers known to be useful in photographic elements in general, for example, subbing layers and interlayers.

The following Examples and Comparative Examples are presented to further illustrate some preferred modes of practice of the invention. Unless otherwise indicated, all starting materials were commercially obtained.

Red and near infrared photosensitivity of electrophotographic elements was evaluated by electrostatically corona-charging the element to an initial potential of −700 volts and exposing the element to 150 microsecond flash of a xenon lamp mounted with a 775 nm narrow band pass filter (approximately 10 nm band, peak intensity output at 775 nm), in an amount sufficient to photoconductively discharge the initial potential down to a level of −350 volts (50% photodischarge). Photosensitivity was measured in terms of the amount of incident actinic radiant energy (expressed in ergs/$cm^2$) needed to discharge the initial voltage down to the desired level. The lower the amount of radiation needed to achieve the desired degree of discharge, the higher is the photosensitivity of the element. Dark decay was determined by letting an unexposed area of the charged element spontanously discharge in the dark for seven seconds. The dark decay was calculated by dividing the amount of dark discharge (after seven seconds) by seven.

The surface resistance (ohms/sq), was determined by measuring the time dependent change in shape of an electrostatic image and fitting to Equation 1 with surface resistance as the only adjustable parameter. The elements were affixed to a grounded vacuum platen. The position and velocity of the platen was computer controlled. The film sample was corona charged to a surface potential of about 500 volts in the dark and positioned at a slit opening of 0.25 cm, for a near-contact exposure. Exposure was effected with a shuttered xenon lamp and monochromator. The electrostatic latent image was detected with a Trek Model 344 Electrostatic Voltmeter with a high resolution probe and the analog signal recorded with a Gould TA240 Easy Graf Recorder. Equation 1 describes the time dependent change in shape of a "square well" latent image profile with the image centered about x=0 and a width of 2a. V is the surface potential, $V_O$ is the initial surface potential, $R_{sq}$ the surface resistance, C the capacitance per unit area, and $\Delta V_o=V_o-V_{exp}$ where $V_{exp}$ is the surface potential in the exposed area.

$$V(x,t) = V_o - \frac{1}{2}\Delta V_o\left[erf\left(\frac{a+x}{\sqrt{\frac{4t}{R_{sq}C}}}\right) + erf\left(\frac{a-x}{\sqrt{\frac{4t}{R_{sq}C}}}\right)\right] \quad (1)$$

EXAMPLE 1

Synthesis of methyl acrylate/methyl methacrylate/methacrylic acid (MaMmE) 70/25/5 wt % latex primer To a 2 liter three-neck round bottom flask fitted with a mechanical stirrer, condenser and a nitrogen inlet was added 400 mL of deionized water, 20 mL of a 10% wt/vol solution of sodium dodecylsulfate, 1.0 gram of sodium persulfate and 0.5 grams of sodium bisulfite while the reaction flask was stirred in a 72° C. water bath. An addition funnel containing 70 grams of methyl acrylate, 25 grams of methyl methacrylate and 5 grams of methacrylic acid was placed on the stirred flask and the monomers were added over a 2 hour period. The aqueous phase and the organic phase were purged previous to the monomer addition with nitrogen. The reaction mixture was initially a pale blue color and then became a translucent whitish-blue color. The reaction was allowed to stir overnight, the addition funnel was removed to vent unreacted monomers under a positive nitrogen flow for 50 minutes, and the reaction flask was removed from the water bath and cooled with tap water. The reaction mixture was purified by dialysis against water for 3 days. The polymer had a $T_g$ of 35° C. (midpoint), a number average molecular weight of 22,600, and a weight average molecular weight 177,000. The resulting solution was then diluted to 2 wt % solids and 0.1 wt % of Triton-100™ surfactant (added as a 10% wt/vol water solution) was added as a coating aid to provide a "priming solution".

Preparation of 80 wt % propylsilane/20 wt. % glycidoxysilane sol-gel

A sol-gel formulation was prepared as follows. Glacial acetic acid (108.0 grams, 1.80 mol) was added dropwise to a previously prepared, stirred mixture of propyltrimethoxysilane (489.6 grams, 2.97 mol) and 3-glycidoxypropyltrimethoxysilane (122.4 grams, 0.518 mol), followed by the dropwise addition of 3-aminopropyltrimethoxysilane (49.6 grams, 0.277 mol). The acidified silanes were then hydrolyzed by the dropwise addition of excess water (312.0 grams, 17.3 mol). The following day, the clear solution was diluted to approximately 20 wt % solids by the dropwise addition of ethanol (1046 grams) and allowed to stir in a covered vessel for I week. DC-190 (16 grams) was subsequently added as a plasticizer, followed by the addition of lithium iodide (9.43 grams, 0.0704 mol) to provide a "sol-gel solution".

Preparation of electrophotographic element.

The above described priming solution was coated onto the upper surface of the image loop (electrophotographic element) of a Kodak 1575 Copier-Duplicator marketed by Eastman Kodak Company of Rochester, N.Y. The image loop had a support of poly(ethylene terephthalate). Overlaying the support was an nickel layer, a charge transport layer, and a charge generation layer.

The image loop was overcoated in the form of a continuous web; that is, prior to being cut to size and spliced into a loop. The priming solution was coated onto the charge generation layer (CGL) using a web coating machine operated at a web speed of 20 ft/min and dryer temperature of 80° F. The resulting coated web, having a primer layer about 0.1–0.5 micrometers thick, was wound on a spool. This web was then coated with the above sol-gel solution at a web speed of 10 ft/min and heating to 200° F., with ramped heating and cooling, and wound on a spool. The web was subsequently cured face down at 180° F. for 24 hours. The cured film was evaluated as follows. Results are presented in Tables 6–8. One piece of overcoated film was evaluated in a Kodak 1575 copier.

Brittleness evaluation

Brittleness was tested by testing samples of the electrophotographic element in accordance with American National Standards Institute Test Standard PH 1.31 Brittleness of Photographic Film, Method B, "WEDGE BRITTLENESS TEST". The following is a description of the procedure.

All samples were tested at about 70° C. and 15 percent relative humidity. The sample size was 15 mm×305 mm. The wedge angle was 9°. The wedge Length was 6 inches. The large wedge opening was 1 inch. The small wedge opening was 0.06 inch.

Samples were cut using a 15 mm Thwing-Albert parallel blade cutter. The samples were allowed to condition for at least 24 hours in the specified environment. The wedge was equipped with a clamp mechanism to hold one end of the loop stationary as the other end is pulled (snapped) through the wedge. The samples were placed in the wedge with the side of interest toward the outside when forming a loop. A reference mark was put on the sample at the wedge opening. This mark was considered the "zero" point for the data collection. The sample was then pulled through the wedge as fast as physically possible using a snap motion with the arm. This process was repeated for a total of 6 samples for each example.

Inspection of the samples required piped transmitted light and or surface reflected light to verify the crack location. The two techniques allow for quick observation with the transmitted light but the reflected light is used to verify samples in question. This results because the image belt has two coatings that respond to the test. Both layer's brittle behavior is observed with transmitted light while only the top surface characteristics can be observed in the reflected mode, allowing separation of the two layers when necessary.

The samples were read using the reference mark placed on the sample previous to testing and locating the crack farthest from that reference mark. The farthest crack is the first crack to occur and represents the largest diameter in the loop at failure. The scale accompanying the wedge provides the diameter of the loop at first failure and has units of inches. The larger the number, the more brittle is the specimen. Six specimens were tested and results were averaged and the standard deviation was determined. Results state the diameter of the loop, in inches, at which the first crack was observed.

Solid State Silicon-29 Nuclear Magnetic Resonance.

The extent of cure of the overcoat was measured by determining the silicon-29 solid state NMR spectra. Resonances were observed in the cross-polarized spectra at −60 PPM, corresponding to $T^2$ silicon atoms, and at −70 PPM, corresponding to $T^3$ silicon atoms. Results are presented as the ratio of $T^2$-silicon atoms to $T^3$ silicon atoms (designated $T^2/T^3$).

Electrical properties under low intensity continuous excitation

One measure of an overcoat's ability to carry charge is to compare film voltage vs. exposure sensitometry using continuous exposure to low intensity light (also referred to as "low intensity continuous exposure" or "LICE"). The overcoated electrophotographic element was evaluated by measuring the exposure necessary at 2 ergs/cm$^2$sec and a wavelength of 680 nm (approximately the maximum spectral sensitivity of the charge generation layer) to discharge the element from +500 volts to +100 volts (referred to herein as "Speed (100 V (erg/cm$^2$)"). The residual voltage or "toe" (referred to herein as "$V_{toe}$ (LICE)") was measured after 45 seconds discharge.

Electrical properties under high intensity flash and erase cycles

In this procedure a belt of the film was exercised for 5000 of the following cycles. The film was charged to an initial voltage, initially set at +600 volts, and exposed with a xenon flash through a Wratten 92 filter (cut off with 10% transmission at 630 nm). The film was then erased by a front exposure using green LED's at an exposure of ten times the exposure necessary to discharge the film from +500 volts to +200 volts. This value was measured after 1 cycle. After the 5000 cycles, during which the relative humidity was maintained at 50% and the temperature at 70° F., the voltage was measured immediately after charging ("$V_{zero}$ (50% RH)") and after erase ("$V_{erase}$ (50% RH)"). The voltage after erase following 1 cycle was subtracted from $V_{erase}$ (50% RH) to provide a value of the difference in erase voltages resulting from the exercising ("$\Delta V_{erase}$ (50% RH)"). Measurements were taken, in the same manner, after exercising for 5000 cycles at 30% relative humidity and 80° F. (referred to as "$V_{zero}$ (30% RH)", "$V_{erase}$ (30% RH)", and "$\Delta V_{erase}$ (30% RH)").

COMPARATIVE EXAMPLE 1

Comparative Example 1 was prepared in substantially the same manner as in Example 1, with the exception that starting materials were changed as indicated in Tables 2–3. The resulting overcoat was so insulating that it could not be run on a Kodak 1575 copier. This is also reflected in the failure of the overcoated film to discharge in the offline electrical test. Results of evaluations, performed as described above for Example 1, are presented in Tables 6–8.

COMPARATIVE EXAMPLES 2–4

According to company literature, Optical Technologies Ultrashield™ coating transfers electrical charge and is particularly useful in extending the life of photoconductor drums. The coating has the appearance of a glassy inorganic-organic material. Three coatings were made on the photoconductor used in Example 1. Results of evaluations, performed as described above for Example 1, are presented in Tables 6–8.

EXAMPLES 2–24

Examples 2–24 were prepared in substantially the same manner as in Example 1, with changes in starting materials as indicated in Tables 2–3. Results of evaluations, performed as described above for Example 1, are presented in Tables 6–8.

Examples 1–24 illustrate electrophotographic elements having various charge carriers and silsesquioxanes. Examples 13–17 illustrate a series of elements having a 60/20/20 silsesquioxane containing 5 wt % of Ludox AS with overcoat thickness increasing from 1–5 micrometers. Neither the amount of cure ($T^2/T^3$) nor the brittleness show dramatic changes over the series. Examples 18–22 illustrate a series of elements having a 0/90/10 silsesquioxane with overcoat thickness increasing from 1–5 micrometers. Unlike the series of Examples 13–17, the brittleness of these highly cured overcoats ($T^2/T^3$ approximately 0.25) increased as the thickness increased. These elements also showed a decreased ability to carry charge with increasing film thickness.

EXAMPLE 25

Example 25 was prepared and evaluated in substantially the same manner as in Example 1, with the changes in starting materials indicated in Tables 4–5. Results of evaluations, performed as described above for Example 1, are presented in Tables 6–8.

EXAMPLE 26

Electrophotographic elements were prepared in the same manner as in Example 1 with the exception that the priming solution was about 50 percent vol./vol. methanol:water. Results were comparable to those in Example 1, with the exception that an increased residual potential was observed.

EXAMPLES 27–31

Examples 27–31 were prepared and evaluated in substantially the same manner as in Example 1, with the changes in starting materials indicated in Tables 9–10. Results of evaluations, performed as described above for Example 1, at relative humidities of about 30–70% relative humidity, are presented in Tables 11–13.

EXAMPLES 32–34

Electrophotographic elements were prepared as described in Example 1, except that silane reactants were varied as indicated in Table 14. Tribocharging properties during electrophotographic development were estimated by use of a linear breadboard incorporating a toner development station as follows. A 5"×8" piece of each electrophotographic element was striped on an edge with conducting paint and attached to an electrically grounded vacuum platen. The film was initially passed over a positive, DC corona and charged to +300 volts, to remove any negative charge that might be present on the photoconductor. The film voltage was then measured using an electrometer. The electrophotographic element was then passed, at a speed of 1 inch/sec, over a grounded development station having a 20 magnet development brush with a strength of approximately 1200 gauss. The station had a core rotating at 1500 rpm and a shell counterrotating at 50 rpm. The separation between the electrophotographic element and the shell was 0.75 mm. The development station contained 12 g of electrophotographic developer marketed by Eastman Kodak Company of Rochester, N.Y. as Olympus C developer (The toner in this developer charges positively.) The station did not contain any sump. Next, the film was transported over an air knife, where 80 psi air blew a 2 inch wide strip of the photoconductor clean of any toner. The clean area of the photoconductor was then passed over a second electrometer, which recorded the potential on the bare film. These procedures were all performed in the dark. Since the air knife cleaned only a strip of the electrophotographic element clear of toner, an adjacent toned strip was available for transmission densitometry measurements of background density. Background measurements were made using an X-Rite transmission densitometer and are reported in dimensionless units equal to the log of the ratio of intensity of output light divided by the intensity of input light. The background density of the electrophotographic elements after development was zero. In all of these examples, there was a good correlation between the quantity of toner deposited and film voltage. Results for film voltages appear in Table 14.

Results on the linear breadboard were compared to results on a Kodak Ektaprint 1575 electrophotographic copier and a good correlation was found. It was determined that background observed on the copier was also acceptable using the electrophotographic elements of these examples.

COMPARATIVE EXAMPLES 5–6

The procedures of Examples 32–34 were repeated using overcoats prepared as described in Example 1, except that silane reactants were varied as indicated in Table 14. There were good correlations between the quantities of toner deposited and film voltages. Results for film voltages appear in Table 14.

COMPARATIVE EXAMPLE 7–8

The procedures of Examples 32–34 were repeated using electrophotographic elements prepared as described in Comparative Example 2. There was a good correlation between the quantity of toner deposited and film voltage. Results for film voltages appear in Table 14. A measurement of the background in Comparative Example 8 gave a background density of 0.70. This background density level is unacceptably high. The use of the electrophotographic elements on an Ektaprint 1575 copier confirmed the uacceptably high background.

EXAMPLES 35–36

The electrophotographic elements prepared in Examples 11–12 were evaluated in an electrophotographic copier. Each element was placed in a Kodak 1575 Copier- Duplicator marketed by Eastman Kodak Company of Rochester, N.Y. and 10,000 copies were produced under both high and low relative humidity conditions. No obvious signs of wear or fatigue were noted for either electrophotographic element.

EXAMPLE 37

The electrophotographic element prepared in Example 24 was evaluated in a Kodak 1575 Copier-Duplicator. Multiple copies were prepared and good image quality was produced on all copies.

EXAMPLE 38

An electrophotographic element was prepared substantially as described in Example 1, except PS036, trimethylsiloxy terminated poly(dimethylsiloxane) marketed by United Chemical Technologies, Inc. of Bristol, Pa., was added at 0.05 weight percent relative to the weight of the sol-gel solution, in place of the DC190.

TABLE 2

| Ex. or C. Ex. | pr/me/gly (parts by weight) | Propyl-silane (mol) | Methyl-silane (mol) | Glycidoxy-silane (mol) | Amino-silane (mol) |
|---|---|---|---|---|---|
| Ex. 1 | 80/0/20 | 2.97 | 0 | 0.518 | 0.277 |
| C. Ex. 1 | 100/0/0 | 3.73 | 0 | 0 | 0.069 |
| Ex. 2 | 80/0/20 | 2.97 | 0 | 0.518 | 0.277 |
| Ex. 3 | 75/5/20 | 2.79 | 0.225 | 0.518 | 0.277 |
| Ex. 4 | 70/10/20 | 2.61 | 0.449 | 0.518 | 0.277 |
| Ex. 5 | 60/20/20 | 2.24 | 0.899 | 0.518 | 0.277 |
| Ex. 6 | 60/20/20 | 2.24 | 0.899 | 0.518 | 0.277 |
| Ex. 7 | 60/20/20 | 2.24 | 0.899 | 0.518 | 0.277 |
| Ex. 8 | 60/20/20 | 2.24 | 0.899 | 0.518 | 0.277 |
| Ex. 9 | 60/20/20 | 2.24 | 0.899 | 0.518 | 0.277 |
| Ex. 10 | 60/20/20 | 2.24 | 0.899 | 0.518 | 0.277 |
| Ex. 11 | 60/20/20 | 2.24 | 0.899 | 0.518 | 0.277 |
| Ex. 12 | 60/20/20 | 2.24 | 0.899 | 0.518 | 0.277 |
| Ex. 13 | 60/20/20 | 2.24 | 0.899 | 0.518 | 0.277 |
| Ex. 14 | 60/20/20 | 2.24 | 0.899 | 0.518 | 0.277 |
| Ex. 15 | 60/20/20 | 2.24 | 0.899 | 0.518 | 0.277 |
| Ex. 16 | 60/20/20 | 2.24 | 0.899 | 0.518 | 0.277 |
| Ex. 17 | 60/20/20 | 2.24 | 0.899 | 0.518 | 0.277 |
| Ex. 18 | 0/90/10 | 0 | 4.04 | 0.259 | 0.277 |
| Ex. 19 | 0/90/10 | 0 | 4.04 | 0.259 | 0.277 |
| Ex. 20 | 0/90/10 | 0 | 4.04 | 0.259 | 0.277 |
| Ex. 21 | 0/90/10 | 0 | 4.04 | 0.259 | 0.277 |
| Ex. 22 | 0/90/10 | 0 | 4.04 | 0.259 | 0.277 |
| Ex. 23 | 20/65/15 | 0.743 | 2.92 | 0.389 | 0.277 |
| Ex. 24 | 0/90/10 | 0 | 4.04 | 0.259 | 0.277 |

TABLE 3

| Ex. or C. Ex. | Li salt (moles) | $I_2$ (moles) | DC-190 (wt. % of solids) | Other addenda |
|---|---|---|---|---|
| Ex. 1 | 0.0704 LiI | 0 | 4 | none |
| C. Ex. 1 | 0 | 0 | 0 | none |
| Ex. 2 | 0.0352 LiI | 0 | 2 | none |
| Ex. 3 | 0.0352 LiI | 0.0175 | 2 | none |
| Ex. 4 | 0.0352 LiI | 0.0175 | 2 | none |
| Ex. 5 | 0.0352 LiI | 0.0175 | 2 | none |
| Ex. 6 | 0.0165 LiI | 0 | 2 | none |
| Ex. 7 | 0.0165 LiI | 0.0008 | 2 | none |
| Ex. 8 | 0.0165 LiI | 0.0016 | 2 | none |
| Ex. 9 | 0.0473 $LiBF_4$ | 0 | 2 | none |
| Ex. 10 | 0 | 0.0174 | 2 | none |
| Ex. 11 | 0.0224 LiI | 0 | 0.5 | 5% Ludox LS |
| Ex. 12 | 0.0224 LiI | 0 | 0.5 | 10% Ludox LS |
| Ex. 13 | 0.0224 LiI | 0 | 0.4 | 5% Ludox AS |
| Ex. 14 | 0.0224 LiI | 0 | 0.4 | 5% Ludox AS |

TABLE 3-continued

| Ex. or C. Ex. | Li salt (moles) | $I_2$ (moles) | DC-190 (wt. % of solids) | Other addenda |
|---|---|---|---|---|
| Ex. 15 | 0.0224 LiI | 0 | 0.4 | 5% Ludox AS |
| Ex. 16 | 0.0224 LiI | 0 | 0.4 | 5% Ludox AS |
| Ex. 17 | 0.0224 LiI | 0 | 0.4 | 5% Ludox AS |
| Ex. 18 | 0.0223 LiI | 0 | 0.1 | none |
| Ex. 19 | 0.0223 LiI | 0 | 0.1 | none |
| Ex. 20 | 0.0223 LiI | 0 | 0.1 | none |
| Ex. 21 | 0.0223 LiI | 0 | 0.1 | none |
| Ex. 22 | 0.0223 LiI | 0 | 0.1 | none |
| Ex. 22 | 0.0223 LiI | 0 | 0.1 | none |
| Ex. 23 | 0.0302 LiI | 0 | 0.1 | Silwet 7602 |
| Ex. 24 | 0.0299 LiI | 0 | 0.1 | none |

TABLE 4

| Ex. | pr/me/gly (parts by weight) | Propyl-silane (mol) | Methyl-silane (mol) | Glycidoxy-silane (mol) | Ethlene-diamine silane (mol) |
|---|---|---|---|---|---|
| Ex. 25 | 100/0/0 | 3.74 | 0 | 0 | 0.50 |

TABLE 5

| Ex. | Li salt (moles) | $I_2$ (moles) | DC-190 (wt. % of solids) | Other addenda |
|---|---|---|---|---|
| Ex. 25 | 0.022 LiI | 0 | 0.1 | none |

TABLE 6

| Ex. or C. Ex. | $T^2/T^3$ | brittleness number. | standard deviation of brittleness number |
|---|---|---|---|
| Ex. 1 | 0.43 | 0.25 | 0.016 |
| C. Ex. 1 | 0.64 | 0.14 | 0.008 |
| C. Ex. 2 | — | 0.48 | 0.026 |
| C. Ex. 3 | — | 0.28 | 0.062 |
| C. Ex. 4 | — | — | — |
| Ex. 2 | — | 0.25 | 0.014 |
| Ex. 3 | 0.43 | — | — |
| Ex. 4 | 0.42 | — | — |
| Ex. 5 | 0.39 | — | — |
| Ex. 6 | — | 0.34 | 0.012 |
| Ex. 7 | — | 0.34 | 0.017 |
| Ex. 8 | — | 0.31 | 0.026 |
| Ex. 9 | — | — | — |
| Ex. 10 | — | — | — |
| Ex. 11 | — | — | — |
| Ex. 12 | — | — | — |
| Ex. 13 | 0.38 | 0.49 | 0.010 |
| Ex. 14 | — | 0.45 | 0.008 |
| Ex. 15 | 0.35 | 0.46 | 0.010 |
| Ex. 16 | — | 0.45 | 0.010 |
| Ex. 17 | 0.30 | 0.48 | 0.018 |
| Ex. 18 | 0.026 | 0.50 | 0.008 |
| Ex. 19 | — | 0.53 | 0.014 |
| Ex. 20 | 0.025 | 0.57 | 0.040 |
| Ex. 21 | — | 0.65 | 0.070 |
| Ex. 22 | 0.024 | 0.81 | 0.073 |
| Ex. 23 | — | 0.83 | 0.075 |
| Ex. 24 | — | — | — |
| Ex. 25 | — | — | — |

TABLE 7

| Ex. or C. Ex. | $V_{zero}$ (50% RH) | $V_{erase}$ (50% RH) | $\Delta V_{erase}$ (50% RH) | $V_{zero}$ (30% RH) | $V_{erase}$ (30% RH) | $\Delta V_{erase}$ (30% RH) |
|---|---|---|---|---|---|---|
| Ex. 1 | 570 | 120 | 90 | 575 | 130 | 80 |
| C. Ex. 1 | 650 | 435 | 185 | — | — | — |
| C. Ex. 2 | 555 | 165 | 105 | — | — | — |
| C. Ex. 3 | 575 | 100 | 50 | 585 | 115 | 50 |
| C. Ex. 4 | — | — | — | 525 | 70 | 15 |
| Ex. 2 | 515 | 120 | 70 | 565 | 145 | 100 |
| Ex. 3 | — | — | — | 520 | 85 | 60 |
| Ex. 4 | — | — | — | 515 | 85 | 60 |
| Ex. 5 | — | — | — | 515 | 90 | 60 |
| Ex. 6 | 535 | 90 | 55 | 565 | 105 | 70 |
| Ex. 7 | 535 | 85 | 50 | 565 | 105 | 70 |
| Ex. 8 | 535 | 90 | 55 | 555 | 100 | 65 |
| Ex. 9 | 560 | 115 | 65 | 550 | 150 | 95 |
| Ex. 10 | 595 | 190 | 120 | 575 | 195 | 110 |
| Ex. 11 | — | — | — | — | — | — |
| Ex. 12 | — | — | — | — | — | — |
| Ex. 13 | — | — | — | 525 | 85 | 50 |
| Ex. 14 | — | — | — | 520 | 85 | 50 |
| Ex. 15 | — | — | — | 520 | 90 | 60 |
| Ex. 16 | — | — | — | 515 | 80 | 50 |
| Ex. 17 | — | — | — | 510 | 80 | 50 |
| Ex. 18 | — | — | — | 520 | 100 | 45 |
| Ex. 19 | — | — | — | 530 | 125 | 45 |
| Ex. 20 | — | — | — | 560 | 160 | 60 |
| Ex. 21 | — | — | — | 570 | 175 | 55 |
| Ex. 22 | — | — | — | 570 | 200 | 55 |
| Ex. 23 | — | — | — | 530 | 75 | 50 |
| Ex. 24 | — | — | — | 590 | 165 | 65 |
| Ex. 25 | — | — | — | — | — | — |

TABLE 8

| Ex. or C. Ex. | Speed (100 V) ($erg/cm^2$) | $V_{toe}$ (LICE) | Overcoat thickness (microns) |
|---|---|---|---|
| Ex. 1 | 5.52 | 20 | 5 |
| C. Ex. 1 | — | — | 5 |
| C. Ex. 2 | — | — | 5 |
| C. Ex. 3 | — | — | 5 |
| C. Ex. 4 | 3.52 | 19 | 5 |
| Ex. 2 | 6.76 | 40 | 5 |
| Ex. 3 | 3.28 | 9 | 5 |
| Ex. 4 | 3.34 | 11 | 5 |
| Ex. 5 | 3.33 | 13 | 5 |
| Ex. 6 | 3.92 | 16 | 5 |
| Ex. 7 | 3.77 | 15 | 5 |
| Ex. 8 | 3.80 | 16 | 5 |
| Ex. 9 | 5.91 | 32 | 5 |
| Ex. 10 | 7.96 | 41 | 5 |
| Ex. 11 | 3.52 | 8 | 5 |
| Ex. 12 | 3.52 | 13 | 5 |
| Ex. 13 | 3.76 | 13 | 1 |
| Ex. 14 | 3.80 | 9 | 2 |
| Ex. 15 | 3.82 | 10 | 3 |
| Ex. 16 | 4.08 | 14 | 4 |
| Ex. 17 | 4.11 | 13 | 5 |
| Ex. 18 | 4.05 | 19 | 1 |
| Ex. 19 | 4.07 | 27 | 2 |
| Ex. 20 | 4.39 | 36 | 3 |
| Ex. 21 | 4.85 | 45 | 4 |
| Ex. 22 | 5.07 | 53 | 5 |
| Ex. 23 | 3.80 | 16 | 5 |
| Ex. 24 | 4.55 | 34 | 3 |
| Ex. 25 | 3.68 | 6 | 2 |

TABLE 9

| Ex. | pr/me/gly (parts by weight) | Propyl-silane (mol) | Methyl-silane (mol) | Glycidoxy-silane (mol) | Amino-silane (moles) |
|---|---|---|---|---|---|
| Ex. 27 | 80/0/20 | 2.97 | 0 | 0.518 | 0.277 |
| Ex. 28 | 75/0/25 | 2.79 | 0 | 0.647 | 0.069 |
| Ex. 29 | 60/20/20 | 2.24 | 0.899 | 0.518 | 0.277 |
| Ex. 30 | 50/25/25 | 1.86 | 1.12 | 0.647 | 0.069 |
| Ex. 31 | 0/50/50 | 0 | 2.25 | 1.29 | 0.069 |

TABLE 10

| Ex. | LiI (moles) | $I_2$ (moles) | DC-190 (wt. % of solids) |
|---|---|---|---|
| Ex. 27 | 0 | 0 | 4 |
| Ex. 28 | 0 | 0 | 5 |
| Ex. 29 | 0 | 0 | 2 |
| Ex. 30 | 0 | 0 | 5 |
| Ex. 31 | 0 | 0 | 5 |

TABLE 11

| Ex. | $T^2/T^3$ | brittleness number. | standard deviation of brittleness number |
|---|---|---|---|
| Ex. 27 | — | 0.18 | 0.005 |
| Ex. 28 | 0.49 | 0.19 | 0.004 |
| Ex. 29 | — | — | — |
| Ex. 30 | 0.4 | 0.27 | 0.012 |
| Ex. 31 | 0.19 | 0.49 | 0.012 |

TABLE 12

| Ex. | $V_{zero}$ (50% RH) | $V_{erase}$ (50% RH) | $\Delta V_{erase}$ (50% RH) | $V_{zero}$ (30% RH) | $V_{erase}$ (30% RH) | $\Delta V_{erase}$ (30% RH) |
|---|---|---|---|---|---|---|
| Ex. 27 | 625 | 295 | 145 | 560 | 450 | 225 |
| Ex. 28 | 540 | 170 | 120 | — | — | — |
| Ex. 29 | — | — | — | — | — | — |
| Ex. 30 | 545 | 200 | 140 | — | — | — |
| Ex. 31 | 535 | 145 | 95 | — | — | — |

TABLE 13

| Ex. | Speed (100 V) ($erg/cm^2$) | $V_{toe}$ (LICE) | Overcoat thickness (microns) |
|---|---|---|---|
| Ex. 27 | 9.15 | 33 Volts | 5 |
| Ex. 28 | — | — | 5 |
| Ex. 29 | — | — | 5 |
| Ex. 30 | — | — | 5 |
| Ex. 31 | — | — | 5 |

TABLE 14

| Ex. or C. Ex. | pr/me/gly (parts by weight) | Tribovoltage after development ± 15 volts |
|---|---|---|
| C. Ex. 5 | 100/0/0 | +120 |
| C. Ex. 6 | 0/100/0 | +30 |
| C. Ex. 7 | — | −50 |
| C. Ex. 8 | — | −80 |
| Ex. 33 | 75/0/25 | +130 |
| Ex. 34 | 0/50/50 | +90 |
| Ex. 35 | 0/50/50 | +45 |

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

What is claimed is:

1. A solid electrolyte comprising: a complex of silsesquioxane and a charge carrier, said complex having a surface resistivity from about $1\times10^{10}$ to about $1\times10^{17}$ ohms/sq, said complex having a $T^2$-silicon $T^3$-silicon ratio of less than 1:1, said complex having a ratio of carbon atoms to silicon atoms of equal to or greater than about 1.2:1.

2. The solid electrolyte of claim 1 wherein said complex has a surface resistivity from about $1\times10^{14}$ to about $1\times10^{17}$ ohms/sq.

3. The solid electrolyte of claim 1 wherein said complex has a ratio of carbon atoms to silicon atoms of greater than about 2:1.

4. The solid electrolyte of claim 1 wherein said complex has a $T^2$-silicon/$T^3$-silicon ratio of less than 0.6:1.

5. The solid electrolyte of claim 1 wherein said complex has a $T^2$-silicon/$T^3$-silicon ratio of less than 0.4:1.

6. The solid electrolyte of claim 1 wherein said complex has a $T^2$-silicon/$T^3$-silicon ratio of less than 0.25:1.

7. The solid electrolyte of claim 1 wherein said silsesquioxane consists essentially of a material represented by the general formula:

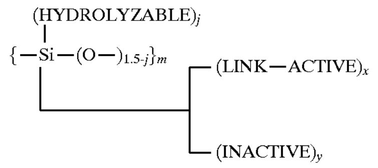

wherein $0\leq j<0.5$;

m is greater than 10;

x+y is about 1;

x/(x+y) is less than about 0.40;

HYDROLYZABLE is selected from the group consisting of: OH; H; I; Br; Cl; alkoxy having from 1 to about 6 carbons; —O—Ar, wherein Ar is phenyl or aminophenyl; —(O-ALKYLENE)$_n$—O-ALKYL; wherein ALKYLENE is an alkylene group having from 2 to about 6 carbons, n is an integer from 1 to about 3, and ALKYL is an alkyl group having from 1 to about 6 carbons; primary and secondary amino having from one to about 6 carbon atoms; —N-(ALKYL)$_2$, wherein each ALKYL is alkyl having from 1 to about 6 carbons; —NH-(ALKYL), wherein ALKYL is alkyl having from 1 to about 6 carbons; and —O—CO-ALKYL, wherein ALKYL is an alkyl having from 1 to 6 carbons;

LINK is divalent and is selected from the group consisting of: alkyl having from 1 to about 12 carbons, fluoroalkyl having from 1 to about 12 carbons, cycloalkyl having a single, 5 or 6 membered ring, and aryl having a single, 5 or 6 membered ring;

ACTIVE is monovalent organic moiety having an O, S, or N complexed with said charge carrier, and having a total of carbons and heteroatoms of from about 4 to about 20;

INACTIVE is monovalent and is selected from the group consisting of: alkyl having from 1 to about 12 carbons, fluoroalkyl having from 1 to about 12 carbons, cycloalkyl having a single, 5 or 6 membered ring, and aryl having a single, 5 or 6 membered ring.

8. The solid electrolyte of claim 7 wherein substantially all HYDROLYZABLE moieties are OH.

9. The solid electrolyte of claim 7 wherein ACTIVE includes an oxy, thio, ester, keto, imino, or amino group.

10. The solid electrolyte of claim 7 wherein ACTIVE is selected from the group consisting of glycidoxy ethers; epoxides; pyrolidinones; amino alcohols; amines; ammonium salts; carboxylic acids; conjugate salts of carboxylic acids; sulfonic acids; conjugate salts of sulfonic acids; and neutral rings and chains of ethylene oxides, propylene oxides, tetramethylene oxides, ethylene imines, and alkylene sulfides; and the total number of carbons in -LINK-ACTIVE is from 4 to about 25 and combinations thereof.

11. The solid electrolyte of claim 7 wherein said charge carrier is a low lattice energy salt or a neutral species capable of forming an ionic or substantially ionic charge transfer complex with said silsesquioxane.

12. The solid electrolyte of claim 7 wherein said charge carrier is selected from the group consisting of $I_2$, LiCl, $LiCOOCH_3$, $LiNO_3$, $LiNO_2$, LiBr, $LiN_3$, $LiBH_4$, LiI, LiSCN, $LiClO_4$, $LiCF_3SO_3$, $LiBF_4$, $LiBPh_4$, NaBr, $NaN_3$, $NaBH_4$, NaI, NaSCN, $NaClO_4$, $NaCF_3SO_3$, $NaBF_4$, $NaBPh_4$, KSCN, $KClO_4$, $KCF_3SO_3$, $KBF_4$, $KBPh_4$, RbSCN, $RbClO_4$, $RbCF_3SO_3$, $RbBF_4$, $RbBPh_4$, CsSCN, $CsClO_4$, $CsCF_3SO_3$, $CsBF_4$, $CsBPh_4$, quaternary ammonium salts, ammonium hydroxide, and ammonium halides; and combinations thereof.

13. The solid electrolyte of claim 7 further comprising colloidal basic hydrophilic silica covalently bonded to said silsesquioxane.

14. A charge transporting element comprising:

(a) a support;

(b) a charge transporting layer comprising: a silsesquioxane-salt complex having a surface resistivity from about $1\times10^{6}$ to about $1\times10^{16}$ ohms/sq, said complex having a ratio of carbon atoms to silicon atoms of greater than 1.1:1; said silsesquioxane consisting essentially of a material represented by the general formula:

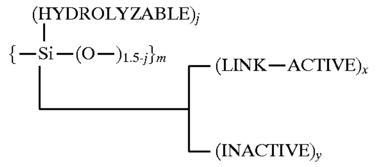

wherein $0\leq j<0.5$;

m is greater than 10;

x+y is about 1;

x/(x+y) is less than about 0.40;

HYDROLYZABLE is selected from the group consisting of: OH; H; I; Br; Cl; alkoxy having from 1 to about 6 carbons; —O—Ar, wherein Ar is phenyl or aminophenyl; —(O-ALKYLENE)$_n$—O-ALKYL; wherein ALKYLENE is an alkylene group having from 2 to about 6 carbons, n is an integer from 1 to about 3, and ALKYL is an alkyl group having from 1 to about 6 carbons; primary and secondary amino having from one to about 6 carbon atoms; —N-$(ALKYL)_2$, wherein each ALKYL is alkyl having from 1 to about 6 carbons; —NH-(ALKYL), wherein ALKYL is alkyl having from 1 to about 6 carbons; —O—CO-ALKYL, wherein ALKYL is an alkyl having from 1 to 6 carbons;

LINK is divalent and is selected from the group consisting of: alkyl having from 1 to about 12 carbons, fluoroalkyl having from 1 to about 12 carbons, cycloalkyl having a single, 5 or 6 membered ring, and aryl having a single, 5 or 6 membered ring;

ACTIVE is monovalent organic moiety having an O, S, or N complexed with a charge carrier, and having a total of carbons and heteroatoms of from about 4 to about 14;

INACTIVE is monovalent and is selected from the group consisting of: alkyl having from 2 to about 12 carbons, fluoroalkyl having from 2 to about 12 carbons, cycloalkyl having a single, 5 or 6 membered ring, and aryl having a single, 5 or 6 membered ring.

15. The charge transporting element of claim 14 wherein said silsesquioxane-salt complex has a surface resistivity from about $1\times10^6$ to about $1\times10^{10}$ ohms/sq.

* * * * *